(No Model.)
W. C. DAILEY.
BICYCLE.
No. 532,143.  Patented Jan. 8, 1895.
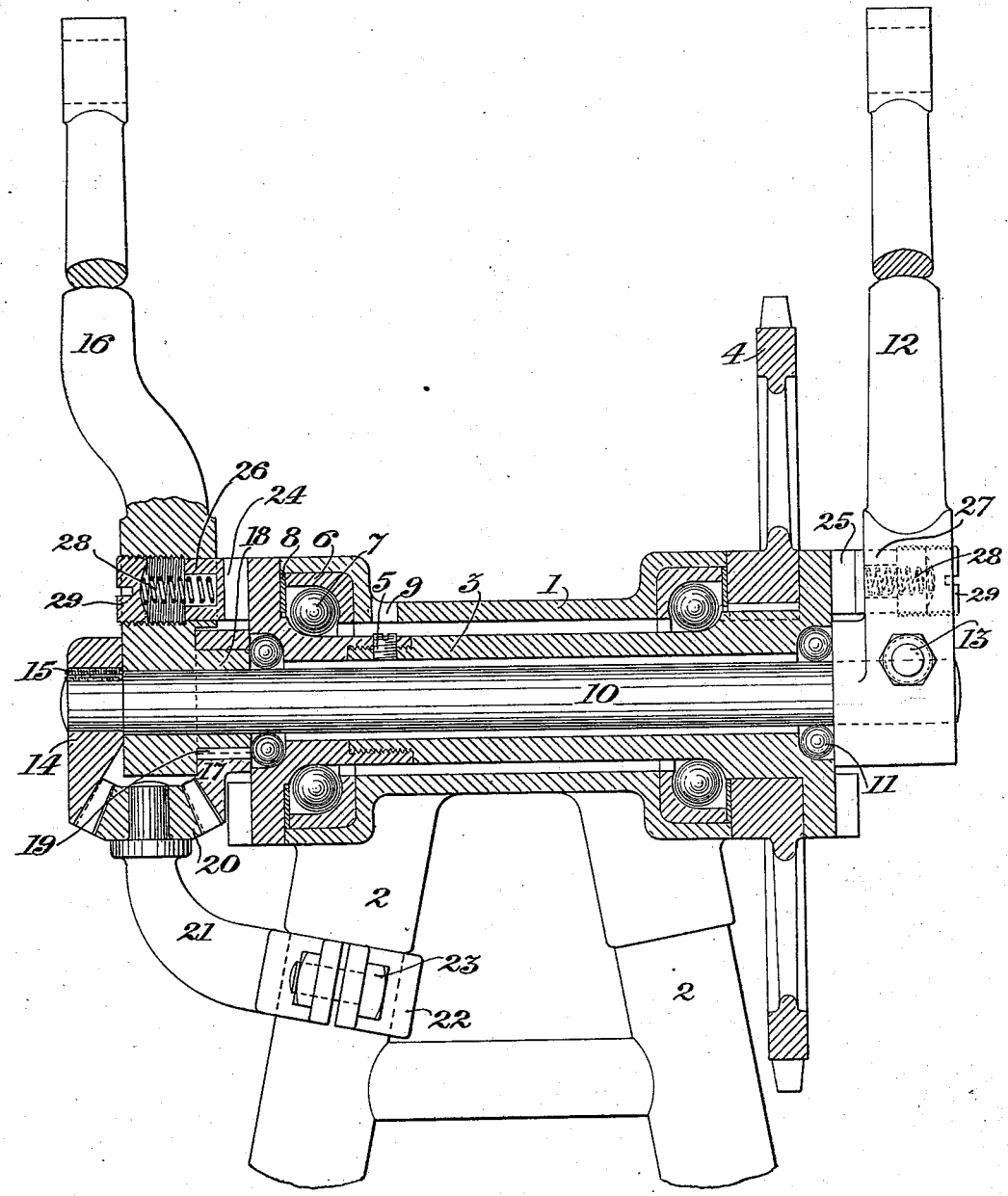
WITNESSES:
Edward R. Zoll
K. M. Gilligan
INVENTOR
William C. Dailey
BY
Augustus B. Stoughton
ATTORNEY

UNITED STATES PATENT OFFICE.

WILLIAM C. DAILEY, OF PHILADELPHIA, PENNSYLVANIA.

BICYCLE.

SPECIFICATION forming part of Letters Patent No. 532,143, dated January 8, 1895.

Application filed August 27, 1894. Serial No. 521,370. (No model.)

*To all whom it may concern:*

Be it known that I, WILLIAM C. DAILEY, a citizen of the United States, residing at the city of Philadelphia, in the county of Philadelphia and State of Pennsylvania, have invented certain new and useful Improvements in Bicycles, of which the following is a specification.

My invention relates to bicycles and more particularly to driving gear or propulsion mechanism therefor.

The principal objects of my present invention are, first, to provide bicycle driving gear or propulsion mechanism constructed and arranged for operation in such manner that the pedal cranks may be rotated in complete circles or may be reciprocated upward and downward in the arcs of circles according as it is desired to drive the machine over level roads or over ascending grades or to afford a change in the muscular movements of the rider or for any other purpose, and, second, to provide such gear or mechanism with means whereby the downward stroke of one pedal causes the other pedal to re-trace its path without the intervention of springs, counter-weights and the like which, of course, have to be overcome in order to effect the downward stroke.

My invention consists of bicycle driving gear or propulsion mechanism comprising, pedal cranks, a driving wheel, connections between the wheel and each crank whereby the downward stroke of each of the latter rotates the wheel, power transmission mechanism for causing the downward stroke of one crank to effect a return motion of the other crank, means for throwing said power transmission mechanism into and out of action, and devices for locking said connections whereby the revolution of the pedal cranks rotates the wheel.

My invention further consists of the improvements hereinafter described and claimed.

The nature, characteristic features and scope of my invention will be more fully understood from the following description taken in connection with the accompanying drawing forming part hereof and in which is illustrated a plan view partly in central section of propelling mechanism or driving gear embodying features of my invention.

In the drawing 1, is a bearing, casing or journal box carried by the frame-work 2, of a bicycle and in this connection it may be remarked that the type of frame-work shown in the drawing is selected only for purposes of illustration and that the particular type of frame-work employed is immaterial to my invention.

3, is a freely revoluble sleeve suitably supported against undue end play and having a driving wheel 4, attached to or forming part of it. In the present instance, the driving wheel 4, is a sprocket wheel adapted to drive one of the traction wheels of the machine through the intervention of a sprocket chain, not shown.

As illustrated in the drawing, the sleeve 3, is made in two parts having their ends correspondingly threaded and screwed together and held against accidental detachment by means of a set screw 5, the object being to permit of the introduction of the cups 6, balls 7, and gaskets 8, into the bearing, casing or journal box 1, whereupon the two parts of the sleeve are inserted at opposite ends of the bearing, casing or journal box 1, and screwed together, and the set-screw 5, is introduced through the aperture 9, and screwed to place, although it must be borne in mind that my invention is not limited to this particular construction.

10, is a shaft supported against undue end-play and revolubly mounted within the sleeve 3, as shown in the drawing by means of ball-bearings 11.

12, is a pedal-crank formed integral with or keyed to one end of the shaft 10. As shown in the drawing, it is keyed by means of a set screw 13.

14, is a bevel gear formed integral with or attached, as by means of a key 15, to the other end of the shaft 10. In the drawing, I have illustrated the employment of a sector of the bevel gear, because this is all of the gear that is necessary for accomplishing the results desired for the reason that when the part 14, is performing its intended function, the pedal cranks are being reciprocated in a comparatively small arc of a circle as is hereinafter more fully set forth.

16, is a pedal crank mounted so as to turn freely, as shown in the drawing on the shaft 10.

17, is a bevel gear attached to or formed integral with the pedal crank 16. In the present instance, the pedal crank 16, is provided with a hub 18, and the bevel gear 17, is, for the reasons above set forth in connection with the bevel wheel 14, in the form of a sector and is keyed to the hub 18, by means of a pin 19.

20, is an idle bevel gear that may be caused to engage and disengage the bevel toothed sectors 14 and 17, for purposes to be hereinafter set forth. In the present instance, this result is accomplished by journaling the bevel gear 20, to a stud or bracket 21, made to suit the style of bicycle and adapted to be shifted in respect to the frame 2. As shown, the stud 21, is provided with a strap 22, and binding screw 23, through the intervention of which it may be shifted and clamped to place on the frame 2. Interposed between each pedal crank 12 and 16, and the driving wheel 4, are pawl-and-ratchet-connections.

As shown in the drawing, the crown ratchet wheels 24 and 25, are applied to or formed integral with the respective ends of the sleeve 3, and the pawls 26 and 27, are located in suitable apertures cut or otherwise formed in the crank arms 12 and 16, and are held up into proper engagement with the ratchet-wheels by means of springs 28.

29, are set screws inserted in the apertures in the crank arms 12 and 16, and adapted to be screwed up so as to engage the pawls and lock them to the teeth of the ratchet wheels and to be screwed outward so as to afford the pawls a range of motion against the influence of their springs for purposes to be hereinafter set forth.

The mode of operation of the above described driving gear or propulsion mechanism is as follows: To propel the machine by turning the pedal cranks in complete circles, the idle bevel gear 20, is shifted clear of the beveled sectors 14 and 17, and crank 16 and the cranks 16 and 12, are locked to the respective ratchet wheels 24 and 25, by screwing up the set screws 29, which engage the pawls 26, and thus prevent them from clearing the teeth of the ratchet wheels, it being understood that for this purpose the cranks 12 and 16, are preferably disposed one hundred and eighty degrees apart or in other words, diametrically opposite each other. Under these circumstances, the rider rotates the cranks 12 and 16 in complete circles and the cranks being locked by the pawls 25, and set screws 29, to the sleeve 3, turn the latter together with the driving wheel 4, in the same direction, thus effecting the propulsion of the machine. To permit the cranks to be reciprocated in the arc of a circle, the bevel gear 20, is brought, in the manner above described, into engagement with the toothed sectors 17 and 14. The pedal cranks are turned into alignment with each other as shown in the drawing and the set screws 29, are screwed outward so as to release the pawls 24 and 25, and permit them to move under the influence of their complemental springs. Under these circumstances, a downward stroke of the pedal crank 12, operating through the intervention of pawl 27, and ratchet wheel 24, imparts a forward motion of rotation to the sleeve 3, and driving wheel 4. This motion of the crank 12, also imparts a similar motion to the shaft 10, and to the bevel toothed sector 14, which causes the latter, acting through the intervention of the bevel wheel 20, to turn the toothed sector 17, and crank arm 16, rearward or upward into position for permitting of the subsequent depression of the crank 16, by the rider. During this upward motion of the crank 16, the pawl 26, slides over the teeth of the ratchet wheel 24, without engaging them. When the crank 16, is pushed forward or downward by the rider, it imparts a forward motion of rotation by means of the pawl-and-ratchet connections 24, and 26, to the sleeve 3, and driving wheel 4. This motion of the crank 16, also causes the toothed sector 14, acting through the intervention of the bevel gear 20, and toothed sector 17, to turn the shaft 10, and crank 12, backward or upward into position for being subsequently depressed by the foot of the rider. During the upward motion of the crank 12, the pawl 27, slides over the teeth of the ratchet wheel 25, which, for this purpose, are made to resemble the teeth of a saw.

From the foregoing description it is apparent that the force applied to effect the downward stroke of one pedal crank also effects the return stroke of the other pedal crank by simply lifting its weight and without the intervention of springs.

It will be obvious to those skilled in the art to which my invention relates that modifications may be made in details without departing from the spirit thereof. Hence I do not limit myself to the precise construction and arrangement of parts hereinabove set forth and illustrated in the drawing, but

Having thus described the nature and objects of my invention, what I claim as new, and desire to secure by Letters Patent, is—

1. A bicycle driving gear or propulsion mechanism comprising, pedal cranks, a driving wheel, connections between the wheel and each crank whereby the reciprocation of each of the latter rotates the wheel, power transmission mechanism for causing the downward stroke of one crank to effect a return motion of the other, means for throwing said power transmission mechanism into and out of action, and devices for connecting each crank to the wheel whereby the revolution of the cranks rotates the wheel, substantially as described.

2. A bicycle driving gear or propulsion mechanism comprising, a driving wheel, a revoluble shaft provided with a pedal crank and a bevel gear, a pedal crank loose on said shaft and provided with a bevel gear, an idle gear, pawl-and-ratchet connections between each crank and sleeve, means for locking and unlocking the pawl-and-ratchet connections, and devices for throwing the gear-wheels into and out of action, substantially as described.

3. A bicycle driving gear or propulsion mechanism comprising, a driving wheel, pedal cranks for rotating the driving wheel through the intervention of pawls and their complemental ratchet-wheels, means for locking said ratchet-wheels to the pedal cranks whereby the complete revolution of the latter rotates the driving wheel, and power transmission mechanism provided with means for throwing it into and out of action and operating to cause the downward stroke of one crank to effect a return motion of the other crank whereby the reciprocation of the cranks rotates the driving wheel, substantially as described.

4. A bicycle driving gear or propulsion mechanism comprising, a revoluble sleeve carrying a sprocket-wheel, a revoluble shaft provided with a pedal crank and a bevel gear, a pedal crank loose on said shaft and provided with a bevel gear, an idle gear, pawl-and-ratchet connections interposed between each of said cranks and sleeve, means for locking said pawl-and-ratchet connections, and devices for shifting the idle bevel gear, substantially as described.

In testimony whereof I have hereunto signed my name.

WILLIAM C. DAILEY.

In presence of—
K. M. GILLIGAN,
A. B. STOUGHTON.